United States Patent
Olszewski et al.

(10) Patent No.: US 9,817,801 B2
(45) Date of Patent: Nov. 14, 2017

(54) WEBSITE CONTENT AND SEO MODIFICATIONS VIA A WEB BROWSER FOR NATIVE AND THIRD PARTY HOSTED WEBSITES

(71) Applicant: Go Daddy Operating Company, LLC, Scottsdale, AZ (US)

(72) Inventors: Marek Olszewski, San Francisco, CA (US); Rene Reinsberg, San Francisco, CA (US)

(73) Assignee: GO DADDY OPERATING COMPANY, LLC, Scottsdale, AZ (US)

( * ) Notice: Subject to any disclaimer, the term of this patent is extended or adjusted under 35 U.S.C. 154(b) by 181 days.

(21) Appl. No.: 14/560,254

(22) Filed: Dec. 4, 2014

(65) Prior Publication Data
US 2015/0154162 A1    Jun. 4, 2015

Related U.S. Application Data

(60) Provisional application No. 61/911,631, filed on Dec. 4, 2013.

(51) Int. Cl.
*G06F 17/00* (2006.01)
*G06F 17/22* (2006.01)
(Continued)

(52) U.S. Cl.
CPC .......... *G06F 17/2252* (2013.01); *G06F 17/24* (2013.01); *G06F 17/212* (2013.01);
(Continued)

(58) Field of Classification Search
CPC ................. H04L 67/10; G06F 17/3089; G06F 17/30864; G06F 17/30899; G06F 17/212;
(Continued)

(56) References Cited

U.S. PATENT DOCUMENTS 8,280,888 B1 * 10/2012 Bierner ................. G06F 17/277
704/4
8,364,523 B2 * 1/2013 Wee ....................... G06Q 30/02
705/14.54

(Continued)

OTHER PUBLICATIONS

TutorialsPoint_HTML5_WebSockets_Tutorial, Date:Jan. 10, 2013 https://web.archive.org/web/20130110100504/http://www.tutorialspoint.com/html5/html5_websocket.htm.*

(Continued)

*Primary Examiner* — Cesar Paula
*Assistant Examiner* — David Faber
(74) *Attorney, Agent, or Firm* — Quarles & Brady LLP

(57) ABSTRACT

Systems and methods for assisting a user to redesign a live website using a browser-based interface are presented. A first computer server hosts a target website that includes a first code snippet configured to, once executed, create a communication channel to a second computer server. The second computer server is configured to, after execution of the first code snippet, retrieve a content of the target website using the communication channel, analyze the content of the target website to identify one or more candidate keywords to incorporate into the target website, transmit, through the communication channel, the one or more candidate keywords for selection by a user on the target website, receive, through the communication channel, a selection of one of the one or more candidate keywords, generate a second code snippet configured to modify the target website to incorporate the selected one of the one or more candidate keywords, and store the second code snippet on the second computer server.

18 Claims, 3 Drawing Sheets

(51) Int. Cl.
*G06F 17/24* (2006.01)
*G06F 17/21* (2006.01)
*G06F 17/30* (2006.01)

(52) U.S. Cl.
CPC .... *G06F 17/2247* (2013.01); *G06F 17/30864* (2013.01); *G06F 17/30899* (2013.01)

(58) Field of Classification Search
CPC ... G06F 17/2247; G06F 17/2252; G06F 17/24
See application file for complete search history.

(56) References Cited

U.S. PATENT DOCUMENTS

| Patent/Pub No. | Date | Inventor | Class |
|---|---|---|---|
| 8,364,662 B1* | 1/2013 | Moyer | G06F 17/30864 707/706 |
| 8,413,045 B2* | 4/2013 | Lemonik | G06F 17/2247 715/234 |
| 8,452,748 B1* | 5/2013 | Pugh | G06F 17/30864 707/706 |
| 8,645,411 B1* | 2/2014 | Bandaru | G06F 17/3089 707/709 |
| 8,752,183 B1* | 6/2014 | Heiderich | G06F 21/577 726/22 |
| 8,869,019 B1* | 10/2014 | Sampath-Kumar | G06F 17/3089 715/208 |
| 8,943,039 B1* | 1/2015 | Grieselhuber | G06F 17/3089 707/709 |
| 8,959,427 B1* | 2/2015 | Carlsson | G06F 17/3089 715/236 |
| 9,141,713 B1* | 9/2015 | Narin | G06F 17/30876 |
| 9,448,978 B2* | 9/2016 | Lemonik | G06F 17/2247 |
| 2003/0046389 A1* | 3/2003 | Thieme | G06F 17/30864 709/224 |
| 2003/0235279 A1* | 12/2003 | Richomme | G06Q 10/109 379/88.15 |
| 2004/0083127 A1* | 4/2004 | Lunsford | G06Q 10/063 705/7.32 |
| 2004/0123244 A1* | 6/2004 | Campbell | G06F 17/243 715/253 |
| 2005/0267872 A1* | 12/2005 | Galai | G06F 17/30864 |
| 2006/0168325 A1* | 7/2006 | Wood | G06F 17/30902 709/238 |
| 2007/0168465 A1* | 7/2007 | Toppenberg | G06Q 50/16 709/218 |
| 2007/0271238 A1* | 11/2007 | Webster | G06F 17/30864 |
| 2008/0028313 A1* | 1/2008 | Ebert | G06Q 30/02 715/730 |
| 2008/0077556 A1* | 3/2008 | Muriente | G06F 17/30864 |
| 2008/0141116 A1* | 6/2008 | Mohan | G06F 17/3089 715/236 |
| 2008/0235671 A1* | 9/2008 | Kellogg | G06F 9/45529 717/139 |
| 2009/0006311 A1* | 1/2009 | Ting | G06F 17/30864 |
| 2009/0094137 A1* | 4/2009 | Toppenberg | G06F 17/30861 705/26.1 |
| 2009/0299978 A1* | 12/2009 | Farfurnik | G06F 17/30864 |
| 2009/0319355 A1* | 12/2009 | Sinyagin | G06Q 30/0224 705/14.25 |
| 2009/0320119 A1* | 12/2009 | Hicks | G06F 17/3089 726/9 |
| 2010/0114864 A1* | 5/2010 | Agam | G06F 17/30864 707/709 |
| 2011/0055217 A1* | 3/2011 | Kamel | G06F 17/30867 707/741 |
| 2011/0106816 A1* | 5/2011 | Crolley | G06F 17/30876 707/748 |
| 2011/0252304 A1* | 10/2011 | Lemonik | G06F 17/2247 715/234 |
| 2012/0016897 A1* | 1/2012 | Tulumbas | G06F 17/30887 707/759 |
| 2012/0047044 A1* | 2/2012 | Lazuka | G06Q 10/10 705/26.4 |
| 2012/0047120 A1* | 2/2012 | Connolly | G06F 17/30864 707/706 |
| 2012/0192063 A1* | 7/2012 | Koren | G06F 17/30905 715/252 |
| 2013/0212461 A1* | 8/2013 | Sarangapani | G06F 11/3608 715/234 |
| 2013/0219264 A1* | 8/2013 | Lemonik | G06F 17/2247 715/234 |
| 2013/0227078 A1* | 8/2013 | Wei | H04L 67/02 709/219 |
| 2013/0232132 A1* | 9/2013 | Kini | G06Q 30/0613 707/709 |
| 2014/0053060 A1* | 2/2014 | Walker | G06F 17/2247 715/234 |
| 2014/0095427 A1* | 4/2014 | Fox | G06F 17/30864 707/603 |
| 2014/0129920 A1* | 5/2014 | Sheretov | G06F 17/30873 715/234 |
| 2014/0258841 A1* | 9/2014 | Strong | G06F 17/30896 715/234 |
| 2014/0310588 A1* | 10/2014 | Bhogal | G06F 17/2247 715/234 |
| 2015/0039432 A1* | 2/2015 | Rao | G06Q 30/0273 705/14.54 |
| 2015/0058339 A1* | 2/2015 | Nijjer | G06F 17/30864 707/736 |
| 2015/0058712 A1* | 2/2015 | Berk | G06F 17/30864 715/234 |
| 2015/0088846 A1* | 3/2015 | Roe | G06F 17/3089 707/706 |
| 2015/0154294 A1* | 6/2015 | Kamdar | G06Q 30/02 707/709 |
| 2015/0302093 A1* | 10/2015 | Jacob | G06F 17/2247 707/708 |
| 2015/0371222 A1* | 12/2015 | Carroll | G06Q 20/38 705/39 |

OTHER PUBLICATIONS

How Browsers Work, Date:Jan. 10, 2013 https://web.archive.org/web/20130110041644/http://taligarsiel.com/Projects/howbrowserswork1.htm.*

The Basics of Passing Values From JavaScript to PHP and Back : The Coders Lexicon Dated May 8, 2013 http://www.coderslexicon.com/the-basics-of-passing-values-from-javascript-to-php-and-back/.*

Build Your Own AJAX Web Applications—Matthew Eernisse Dated Jun. 28, 2006 https://www.sitepoint.com/build-your-own-ajax-web-apps/.*

Client side and server side scripting—Martin Matthews Dated Copyright 2010-2011 http://www.yourwebskills.com/clientserver.php.*

* cited by examiner

WEBSITE CONTENT AND SEO MODIFICATIONS VIA A WEB BROWSER FOR NATIVE AND THIRD PARTY HOSTED WEBSITES

CROSS-REFERENCE TO RELATED APPLICATIONS

This application claims priority to U.S. Provisional Patent Application No. 61/911,631, filed on Dec. 4, 2013 and entitled "WEBSITE CONTENT AND SEO MODIFICATIONS VIA A WEB BROWSER FOR NATIVE AND THIRD PARTY HOSTED WEBSITES."

FIELD OF THE INVENTION

The present invention generally relates to website design and communication, and, more specifically, to systems and methods for assisting a user to redesign a live website using a browser-based interface.

BACKGROUND OF THE INVENTION

The information on web pages is in the form of programmed source code that the browser interprets to determine what to display on the requesting device. The source code may include document formats, objects, parameters, positioning instructions, and other code that is defined in one or more web programming or markup languages. One web programming language is HyperText Markup Language ("HTML"), and all web pages use it to some extent. HTML uses text indicators called tags to provide interpretation instructions to the browser. The tags specify the composition of design elements such as text, images, shapes, hyperlinks to other web pages, programming objects such as JAVA applets and JavaScript resource calls, form fields, tables, and other elements. The web page can be formatted for proper display on computer systems with widely varying display parameters, due to differences in screen size, resolution, processing power, and maximum download speeds.

For Internet users and businesses alike, the Internet continues to be increasingly valuable. Individuals and businesses depend on their online presences, particularly their websites, to deliver current and useful information to customers, readers, and other Internet users. However, website design remains a difficult skill to learn and apply effectively. Web page editors exist for helping non-programmers edit their websites using what is known as a what-you-see-is-what-you-get (WYSIWYG) interface that renders the web page source code to a display and provides editing tools for adding and modifying web page elements. It would be advantageous to provide such as WYSIWYG interface that operates on the actual website code as it is rendered in a browser, so a user can be sure that what is being edited is what will be displayed to a website visitor.

Customers frequently use Internet search engines, such as GOOGLE, BING, YAHOO, or BAIDU, to find businesses that provide the goods or services sought. The customer enters keywords relevant to the goods or services into the search engine and receive search engine results pages (SERPs) displaying websites or web pages in order of relevance to the entered keywords. In order to attract customers online, a business benefits from its website placing highly on SERPs for keywords that are relevant to its business. To improve its placement, a business may engage in search engine optimization (SEO) of its website. SEO may include modifying the code of web pages in the business's website to include strategically selected keywords in particular parts of the web pages. However, due to the volume of businesses having an Internet presence, a business may have difficulty identifying and implementing the most effective keywords for improving its SERP placement.

Some Internet users, typically those that are larger and more sophisticated, may provide their own hardware, software, and connections to the Internet. But many Internet users either do not have the resources available or do not want to create and maintain the infrastructure necessary to host their own websites. To assist such individuals (or entities), hosting companies exist that offer website hosting services. These hosting service providers typically provide the hardware, software, and electronic communication means necessary to connect multiple websites to the Internet. A single hosting service provider may literally host thousands of websites on one or more hosting servers. There are many hosting service providers, and a novice website owner may find it difficult to access and manipulate his website through the hosting service provider's resources. It would be advantageous for a WYSIWYG editing interface to be able to create website modifications for any website, regardless of its hosting service provider.

DETAILED DESCRIPTION OF THE PREFERRED EMBODIMENT

The present invention overcomes the aforementioned drawbacks by providing a system and method for the modification of a live website using an editing interface that loads web pages of the live website and presents the web pages to a user along with editing and analysis tools that suggest and make changes to the website that will improve SEO. The present invention further overcomes the aforementioned drawbacks by showing the user the effects of modifications as they are made, and by executing the modifications using one or more code snippets that modify the website's document object model (DOM) as the website is loaded in a visitor's browser.

The web server tasked with serving the website to requesting devices, also known as a hosting provider, may perform one or more algorithms for the website SEO, design, and design assistance, and may further perform one or more algorithms for the website creation. Alternatively, the web server may assign the SEO and website design and creation to one or more related computer systems, such as another web server, collection of web or other servers, a dedicated data processing computer, or another computer capable of performing the creation algorithms. Alternatively, a standalone program may be delivered to and installed on a personal computing device, such as the user's desktop computer or mobile device, and the standalone program may be configured to cause the personal computing device to perform the algorithms. For clarity of explanation, and not to limit the implementation of the present methods, the methods are described below as being performed by a web server that serves the web page to requesting devices.

Figure 1:
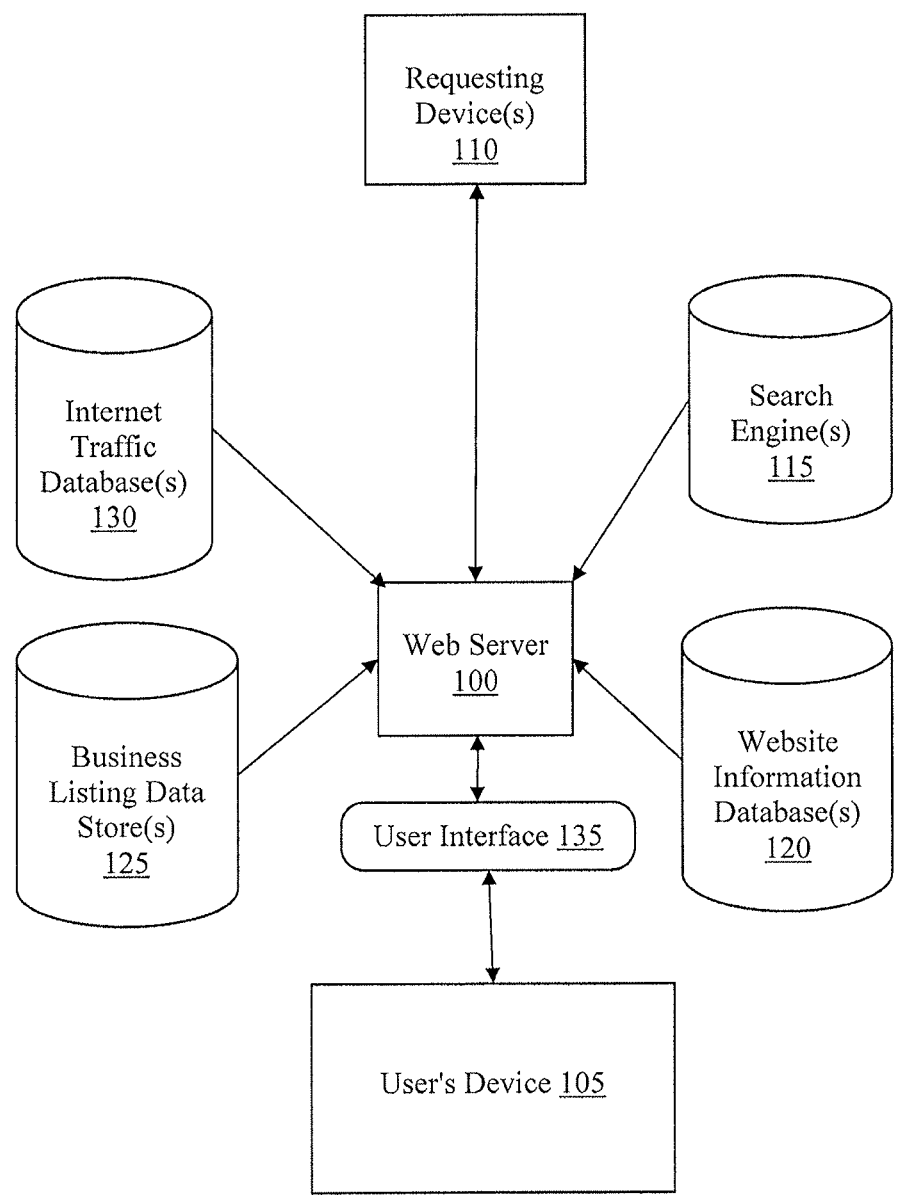
FIG. 1 is schematic diagram of a system and associated operating environment in accordance with the present disclosure.

Referring to FIG. 1, a web server 100 may be configured to communicate over the Internet with one or more requesting devices 110 in order to serve requested website content to the requesting device 110. The requesting devices 110 may request the website content using any electronic communication medium, communication protocol, and computer software suitable for transmission of data over the Internet. Examples include, respectively and without limitation: a wired connection, WiFi or other wireless network, cellular network, or satellite network; Transmission Control Protocol and Internet Protocol (TCP/IP), Global System for mobile Communications (GSM) protocols, code division multiple access (CDMA) protocols, and Long Term Evolution (LTE) mobile phone protocols; and web browsers such as MICROSOFT INTERNET EXPLORER, MOZILLA FIREFOX, and APPLE SAFARI.

The web server 100 may be configured to create or modify a website that can be requested by and displayed on requesting devices 110. In some embodiments, such creation may include generating a plurality of versions of the website that convey substantially the same content but are particularly formatted to be displayed on certain requesting devices 110 or in certain browsers. For example, the web server 100 may generate a first version of the website that is formatted for PCs, and a second version of the website that is formatted for display on mobile phones. In other embodiments, such creation may include converting a website from a format that can be displayed on one type of requesting device 110 into a website that can be displayed on another type of requesting device 110. For example, the web server 100 may, upon receiving a request for the website from a mobile phone, convert the website designed to be displayed on a PC into a format that can be displayed on the mobile phone. In the present disclosure, therefore, the term website refers to any web property communicable via the Internet, such as websites, mobile websites, web pages within a larger website (e.g. profile pages on a social networking website), vertical information portals, distributed applications, and other organized data sources accessible by any device that may request data from a storage device (e.g., a client device in a client-server architecture), via a wired or wireless network connection, including, but not limited to, a desktop computer, mobile computer, telephone, or other wireless mobile device.

The web server 100 may be configured to communicate electronically with one or more data stores in order to retrieve information from the data stores. The electronic communication may be over the Internet using any suitable electronic communication medium, communication protocol, and computer software including, without limitation: a wired connection, WiFi or other wireless network, cellular network, or satellite network; TCP/IP or another open or encrypted protocol; browser software, application programming interfaces, middleware, or dedicated software programs. The electronic communication may be over another type of network, such as an intranet or virtual private network, or may be via direct wired communication interfaces or any other suitable interface for transmitting data electronically from a data store to the web server 100. In some embodiments, a data store may be a component of the web server 100, such as by being contained in a memory module or on a disk drive of the web server 100.

A data store may be any repository of information that is or can be made freely or securely accessible by the web server 100. Suitable data stores include, without limitation: databases or database systems, which may be a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, or other means of data storage located on a computer, client, server, or any other storage device known in the art or developed in the future; file systems; and electronic files such as web pages, spreadsheets, and documents. Each data store accessible by the web server 100 may contain information that is relevant to the creation, modification, or SEO optimization of the website, as described below. Such data stores include, without limitation to the illustrated examples: search engines 115; website information databases 120, such as domain registries, hosting service provider databases, website customer databases, and Internet aggregation databases such as archive.org; business listing data stores 125, such as YELP!, Yellow Pages, GOOGLE PLACES, LOCU, and the like; and Internet traffic databases 130 as described below.

To create or modify its website, a user may access the web server 100 with the user's device 105, which may be a PC, a mobile device, or another device able to connect electronically to the web server 100 over the Internet or another computer network. The user may be an individual, a group of individuals, a business or other organization, or any other entity that desires to publish a website that conveys information about the user or another topic, where the information may be of a commercial or a non-commercial nature, and where the website is configured to maximize its own prominence within search results for certain words related to the content of the website. For clarity of explanation, and not to limit the implementation of the present methods, the methods are described below as being performed by a web server that receives input for creating a website for a small business, such as a restaurant or bar, retail store, or service provider (e.g. barber shop, real estate or insurance agent, repair shop, equipment renter, and the like), unless otherwise indicated.

In some embodiments, the user's device 105 may interact with a user interface 135 that facilitates data collection and transmission between the device 105 and the web server 100. The user interface 135 may be implemented using hardware, software, or a combination thereof. The user interface 135 may reside in the memory of the web server 100, of the user's device 105, or of a distinct computer server or other computing device.

Figure 2:
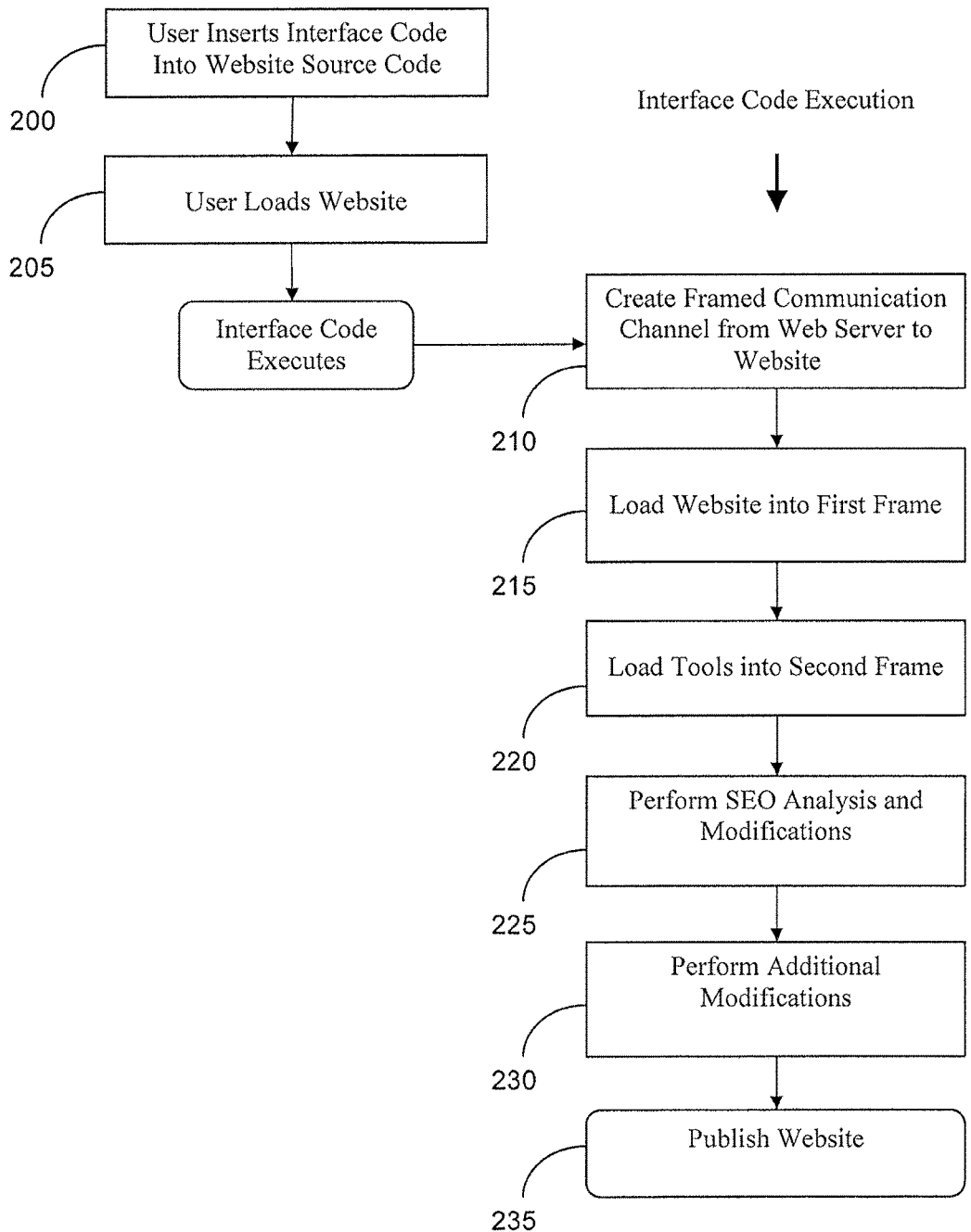
FIG. 2 is a flow diagram of a first embodiment of a method for automating search engine optimization of a website in accordance with the present disclosure.

Referring to FIG. 2, the presently described interface between the web server 100 and the target website to be modified may be accessed using one or more interface code snippets inserted into the source code of one or more web pages in the target website. The code snippets may be a JavaScript function call configured to initiate the interface and connect the web server 100 to the target website as described below. At step 200, the user may insert the interface code into one or more of the web pages using any suitable website design tool, including a hosted design platform such as PLESK or a design tool provided by a content management system such as WORDPRESS. At step 205, the user loads the website into the user's browser, which causes the interface code to execute and activate the interface.

Figure 3:
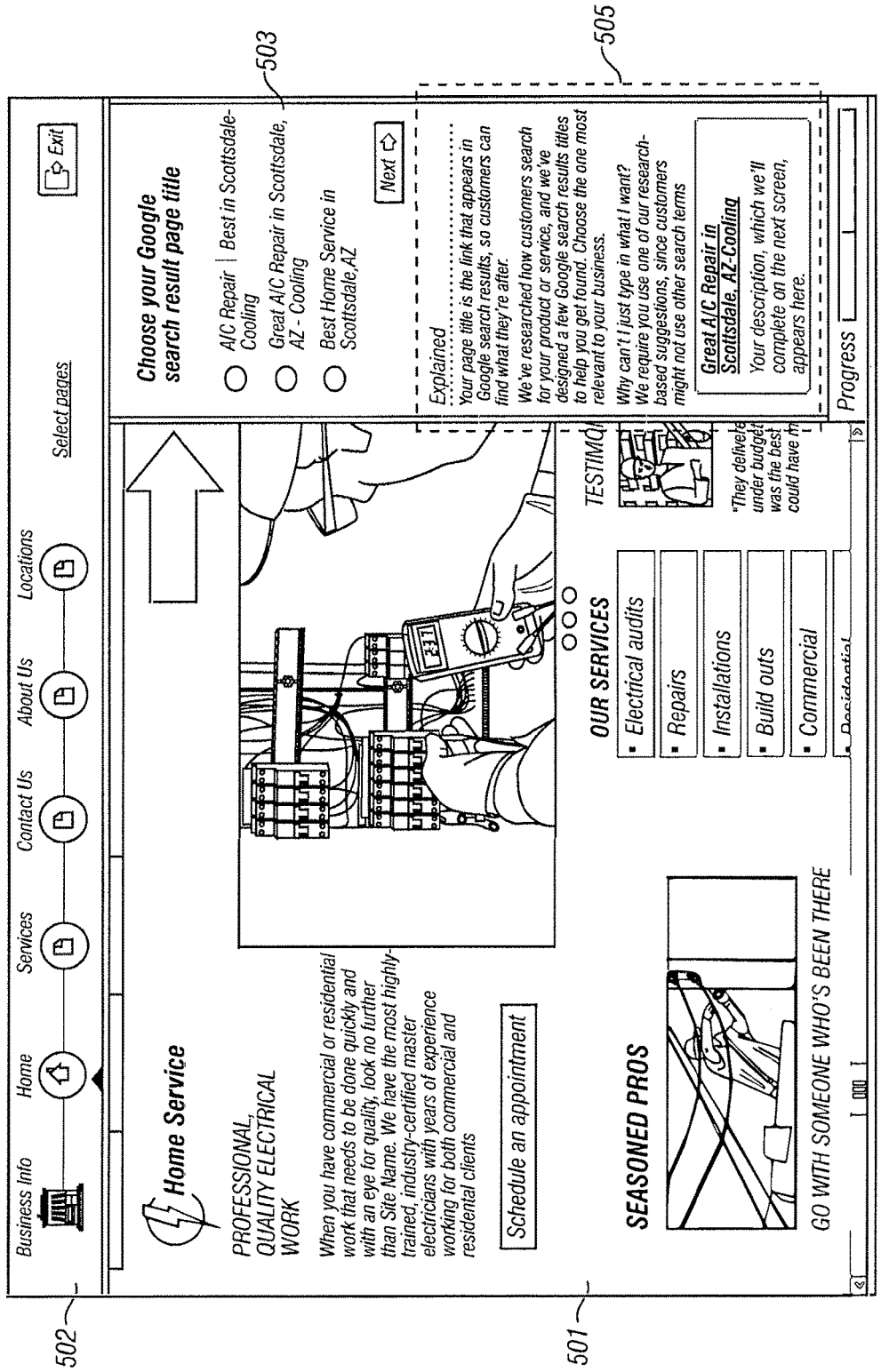
FIG. 3 is a screenshot diagram of using an interface to optimize a web page title.

At step 210, the interface creates a communication channel between the target web page and the web server 100. The communication channel may be facilitated using a plurality frames, such as IFRAMES, created by the interface. At step 215, the target website is loaded into a first frame. The target website may be rendered as it would appear in the user's browser if normally visited by the user. At step 220, one or more modification tool sets may be loaded into a second frame appearing next to, above, or below the first frame. The communication between the first and second frames allows the web server 100 to see into the "inner workings," i.e., the source code and layout, of the web page directly from a visitor's browser and perform the analysis and modification of the website as described below. As shown in the example of FIG. 3, the user may view the original website in the first frame 501 of the interface 500, selector buttons for the web pages in a second frame 502, and modification instructions in a third frame 503.

At step 225, the web server 100 may perform SEO analysis of one or more of the web pages. In the illustrated method and other methods according to this disclosure, SEO analysis may include identifying one or more valuable keywords and incorporating the keywords into the user's website. A keyword's value derives from its relevance to goods, services, or content offered for sale or otherwise provided by the user, such that the user desires its website to place highly on SERPs for searches that include the keyword. The methods of the present invention may use any suitable methodology for identifying a set of keywords that are pertinent to the user's website. Preferably, such methodologies are partially or fully automated, such as by scraping information from the source code of the web pages and performing keyword identification on the information, but in some embodiments the keywords may be supplied by the user or another entity through manual entry of the keywords in an interface. SEO analysis may include other methods of identifying data on the web page that is relevant to SERP placement or indexing of the web page. For example, the web server 100 may identify a navigation breadcrumb or a store address on the web page, in order to semantically tag the store address as described below. SEO analysis may further include identifying keywords or other information relevant to SERP placement or web page indexing using data obtained from another data store, such as the data stores 115-130 described above with respect to FIG. 1.

From results obtained in the SEO analysis, the web server may suggest modifications to the website that will improve SEO of the web page. The web server 100 may assist the user to select the most suitable keywords and place them into strategic positions on a particular web page, in order to optimize the web page for prominent placement on SERPs of one or more search engines. A strategic position is a section of HTML code in which the content is given a high weight in search engine indexing algorithms. For example, the GOOGLE indexing algorithm considers words in the web page title (i.e., the <title> HTML tag) to have the most relevance to the subject matter of the web page and gives the title the most weight, while on-page content such as headlines (i.e., <h1> and <h2> HTML tags), paragraphs, images, and the like, have decreasing, but still valuable, weight. FIG. 3 illustrates an example of assisting a user to select an appropriate web page title. In some embodiments, the keyword insertion may be guided by educational displays 505. In some embodiments, the web server 100 may present pre-formatted suggestions for the content to be inserted into the web page, and may automatically insert the content as described below. In some embodiments, the web server 100 may automatically insert non-rendered markup, such as Microdata or RDFa tags, to identify data on the web page that should receive additional indexing or display formatting in a search engine index.

At step 230, the web server 100 may perform additional modifications to the web page design as input by the user. Such modifications may include relocating or resizing page elements, changing text or images, and performing other design changes that the user may view in real-time in the first frame.

As modifications are made at steps 225 and 230, the web server 100 may generate code snippets, such as JavaScript instructions, that will apply the modifications to the original source code of the target website. That is, the original source code of the target website may not be edited, but instead the web server 100 may create a revised DOM for the website that is loaded through the code snippet inserted by the user at step 200 or subsequently to that step, such as at publication of the changes. At step 235, the interface may be instructed to publish the modified website, which causes the web server 100 to store the modifications locally. The modifications are then retrieved by the code snippet call on subsequent page loads, and the web page is rebuilt in real-time in a visitor's browser.

The schematic flow chart diagrams included are generally set forth as logical flow-chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present invention has been described in terms of one or more preferred embodiments, and it should be appreciated that many equivalents, alternatives, variations, and modifications, aside from those expressly stated, are possible and within the scope of the invention.

We claim:
1. A system, comprising:
a first computer server hosting a target website including:
an original source code, and
an original document object model (DOM); and
a second computer server configured to:
execute a function call to a first scripting instruction within the original source code creating a communication channel connection to the target website to retrieve the original source code;
automatically crawl the original source code to identify one or more candidate keywords, which previously resulted in a high rank in a search engine result according to a search engine indexing algorithm;
render, from the first scripting instruction, a browser-based graphical user interface (GUI) including:
a first hypertext markup language (HTML) frame rendering the target website according to the origi- nal DOM within the original source code, and incorporating the one or more candidate keywords, and a second HTML frame including at least one GUI control configured to receive, from a user of the target website, a selection of the one or more candidate keywords;

transmit, through the communication channel, the GUI;

receive, through the communication channel, the selection of one of the one or more candidate keywords;

dynamically generate a second scripting instruction causing the second computer server to:

generate a revised DOM to rebuild, in real time and without modification to the original source code, the target website according to at least one modification to the original DOM received from the GUI, incorporate the selected one of the one or more candidate keywords into the revised DOM, and modify the first HTML frame in real time, to display the rebuilt target website including the at least one modification and the selected one of the one or more candidate keywords;

store the second scripting instruction, and the revised DOM in a database coupled to the network; and upon a second execution of the function call to the first scripting instruction:

retrieve:

from the first computer server, the original source code, and from the database:

the second scripting instruction, and the revised DOM; and dynamically rebuild the target web page including the revised DOM; and transmit the rebuilt target webpage to a computer client for display.

2. The system of claim 1, wherein the second scripting instruction is configured to modify at least one of a title hyper-text markup language (HTML) tag, and a headline HTML tag.

3. The system of claim 1, wherein the second code snippet scripting instruction is encoded as dynamically-generated JavaScript instructions.

4. The system of claim 3, wherein the first scripting instruction is encoded within the original source code of the target website as a JavaScript function call, automatically executed when loaded into a browser, causing the second computer server to:

connect to the target website; and generate the GUI to redesign the target website.

5. The system of claim 1, wherein the second computer server is configured to transmit a user interface for modifying the target website through the communication channel for display with the target website, the user interface comprising:

the first hypertext markup language (HTML) frame rendering the target website as displayed in a browser according to a layout defined in the original source code of the target website; and the second HTML frame displaying a recommendation to optimize a content of the target website; and a third HTML frame displaying:

an editing UI control configured to receive an input from a user and dynamically update the design of the target website displayed in the first HTML frame; or a non-rendered display of the source code of the target website configured to receive an input from the user and dynamically update the design of the target website displayed in the first HTML frame.

6. The system of claim 1, wherein the second computer server is configured to analyze the source code of the target website to identify the one or more candidate keywords, comprising the second computer server automatically:

accessing at least one data store to identify a first keyword as a factor in producing the high rank in the search engine result according to the search engine indexing algorithm;

crawling the source code of the target website to determine if the first keyword is in the source code; and responsive to a determination that the first keyword is not in the source code, generating the one or more candidate keywords from the first keyword.

7. The system of claim 1, wherein the second scripting instruction is configured to modify the original DOM of the target website after the target website is loaded by a browser, comprising the step of dynamically generating JavaScript instructions within the revised DOM, the instructions applying at least one modification, as received from the GUI, and as it is rendered in a browser, to the original source code of the target website without modifying the original source code, thereby:

relocating a website element;

resizing the website element; or changing at least one text string or image.

8. A system, comprising:

a first computer server hosting a target website including:

an original source code, and an original document object model (DOM); and a second computer server configured to:

analyze a content of the target website;

execute a function call to a first scripting instruction within the original source code creating a communication channel connection to the target website to retrieve the original source code;

automatically crawl the original source code to identify one or more candidate keywords, which previously resulted in a high rank in a search engine result according to a search engine indexing algorithm;

render, from the first scripting instruction, a browser-based graphical user interface (GUI) including:

a first hypertext markup language (HTML) frame rendering the target website according to the original DOM within the original source code, and incorporating the one or more candidate keywords, and a second HTML frame including at least one GUI control configured to receive, from a user of the target website, a selection of the one or more candidate keywords;

transmit, through the communication channel, the GUI;

receive, through the communication channel, the selection of one of the one or more candidate keywords;

dynamically generate a second scripting instruction causing the second computer server to:

generate a revised DOM to rebuild, in real time and without modification to the original source code, the target website according to at least one modification to the original DOM received from the GUI, incorporate the selected one of the one or more candidate keywords into the revised DOM, and modify the first HTML frame in real time, to display the rebuilt target website including the at least one modification and the selected one of the one or more candidate keywords;

store the second scripting instruction, and the revised DOM in a database coupled to the network; and upon a second execution of the function call to the first scripting instruction:

retrieve:

from the first computer server, the original source code, and from the database:

the second scripting instruction, and the revised DOM; and dynamically rebuild the target web page including the revised DOM; and transmit the rebuilt target webpage to a computer client for display.

9. The system of claim 8, wherein the second scripting instruction is configured to modify at least one of a title hyper-text markup language (HTML) tag, and a headline HTML tag.

10. The system of claim 8, wherein the second code snippet scripting instruction is encoded as dynamically-generated JavaScript instructions.

11. The system of claim 10, wherein the first scripting instruction is encoded within the original source code of the target website as a JavaScript function call, automatically executed when loaded into a browser, causing the second computer server to:

connect to the target website; and generate the GUI to redesign the target website.

12. The system of claim 8, wherein the second computer server is configured to transmit a user interface for modifying the target website through the communication channel for display with the target website, the user interface comprising:

the first hypertext markup language (HTML) frame rendering the target website as displayed in a browser according to a layout defined in the original source code of the target website; and the second HTML frame displaying a recommendation to optimize a content of the target website; and a third HTML frame displaying:

an editing UI control configured to receive an input from a user and dynamically update the design of the target website displayed in the first HTML frame; or a non-rendered display of the source code of the target website configured to receive an input from the user and dynamically update the design of the target website displayed in the first HTML frame.

13. The system of claim 8, wherein the second computer server is configured to analyze the source code of the target website to identify the one or more candidate keywords, comprising the second computer server automatically:

accessing at least one data store to identify a first keyword as a factor in producing the high rank in the search engine result according to the search engine indexing algorithm;

crawling the source code of the target website to determine if the first keyword is in the source code; and responsive to a determination that the first keyword is not in the source code, generating the one or more candidate keywords from the first keyword.

14. The system of claim 8, wherein the second scripting instruction is configured to modify the original DOM of the target website after the target website is loaded by a browser, comprising the step of dynamically generating JavaScript instructions within the revised DOM, the instructions applying at least one modification, as received from the GUI, and as it is rendered in a browser, to the original source code of the target website without modifying the original source code, thereby:

relocating a website element;

resizing the website element; or changing at least one text string or image.

15. A method, comprising:

hosting a first computer server, a target website including:

an original source code, and an original document object model (DOM);

executing, by a second computer server, a function call to a first scripting instruction within the original source code creating a communication channel connection to the target website to retrieve the original source code;

automatically crawling the original source code to identify one or more candidate keywords, which previously resulted in a high rank in a search engine result according to a search engine indexing algorithm;

rendering, from the first scripting instruction, a browser-based graphical user interface (GUI) including:

a first hypertext markup language (HTML) frame rendering the target website according to the original DOM within the original source code, and incorporating the one or more candidate keywords, and a second HTML frame including at least one GUI control configured to receive, from a user of the target website, a selection of the one or more candidate keywords;

transmitting, through the communication channel, the GUI;

receiving, through the communication channel, the selection of one of the one or more candidate keywords;

dynamically generating a second scripting instruction causing the second computer server to:

generate a revised DOM to rebuild, in real time and without modification to the original source code, the target website according to at least one modification to the original DOM received from the GUI, incorporate the selected one of the one or more candidate keywords into the revised DOM, and modify the first HTML frame in real time, to display the rebuilt target website including the at least one modification and the selected one of the one or more candidate keywords;

storing the second scripting instruction, and the revised DOM in a database coupled to the network; and upon a second execution of the function call to the first scripting instruction:

retrieving:

from the first computer server, the original source code, and from the database:

the second scripting instruction, and the revised DOM; and dynamically rebuild the target web page including the revised DOM; and transmitting the rebuilt target webpage to a computer client for display.

16. The method of claim 15, wherein the second scripting instruction is configured to modify at least one of a title hyper-text markup language (HTML) tag, and a headline HTML tag.

17. The method of claim 15, wherein the second code snippet scripting instruction is encoded as dynamically-generated JavaScript instructions.

18. The method of claim 17, wherein the first scripting instruction is encoded within the original source code of the target website as a JavaScript function call, automatically executed when loaded into a browser, causing the second computer server to:
   connect to the target website; and
   generate the GUI to redesign the target website.

* * * * *